Jan. 16, 1968     D. B. SOLL     3,363,965
EXTRAOCULAR MUSCLE BALANCE TESTING MEANS
Filed Sept. 5, 1963

INVENTOR.
DAVID B. SOLL

BY Paul Maleson
ATTORNEY

United States Patent Office 3,363,965
Patented Jan. 16, 1968

3,363,965
EXTRAOCULAR MUSCLE BALANCE TESTING MEANS
David B. Soll, 5001 Frankford Ave., Philadelphia, Pa. 19124
Filed Sept. 5, 1963, Ser. No. 306,725
2 Claims. (Cl. 351—4)

ABSTRACT OF THE DISCLOSURE

A visual testing device to provide fixation points at cardinal points of gaze to aid in strabismus measurements. An extensible and pivotable arm is mounted on a support and has an illuminated fixation point at the outer end. Means to measure the degree of elevation and to control the amount of illumination are provided on the support.

---

This invention relates to apparatus useful in the examination of eyes for extraocular muscle balance testing. More particularly, it relates to an apparatus of compact, convenient and reliable nature particularly suitable for mounting on the pre-existent stand often used by ophthalmologists, optometrists, orthoptic technicians and others near the chair in which the patent is seated for testing.

The particular function served by this apparatus is in the diagnosing of the presence and extent of extraocular muscular imbalance between the eyes. It is useful in the diagnosing of strabismus, which is a problem in eye coordination, and similar conditions. The device is suitable to detect such problems and to determine which muscles are at fault. The apparatus has particular advantages if used for making a quantitative determination, in which case the patent looks through corrective prisms. The apparatus provides a choice of fixation points, and different directions of gaze of the patient are attained by directing the patient's attention to the fixation point on the apparatus. The prism required to correct the image of the fixation point at various positions, together with the position of the fixation point as read from the apparatus itself, combine to give a quantitative result. This is the common and most useful aspect of the invention.

It has been known to use a hand held point of attention, such as a flashlight, but this method lacks the quantitative aspects of the present invention. It has been known to provide relatively elaborate apparatus for the purposes of visual field testing, but the structure of such apparatus is specifically directed to visual field testing, whereas the present invention is directed to different function as has been described.

It is an object of this invention to provide an extraocular muscle balance testing means.

It is an object of this invention to provide a fixation point mounted on a telescoping arm, said arm being angularly adjustable, and means to determine the angular position.

Other aims and objects of this invention are made apparent in the following specification and claims.

The invention is best understood in connection with the accompanying drawings, in which like reference numerals refer to like parts and in which.

Figure 1:
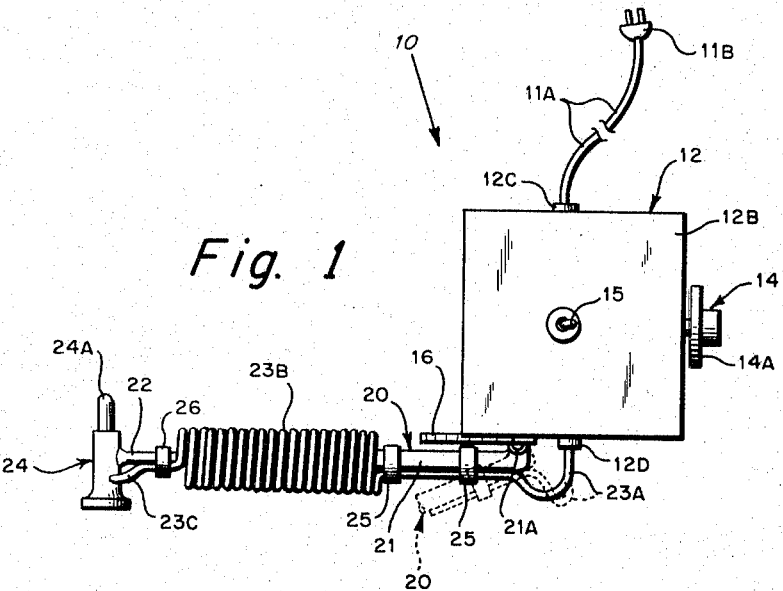
FIGURE 1 is a top view of the apparatus with the arm retracted.

The apparatus is best initially described in connection with FIGURE 2, which shows a side view. The extraocular muscle balance testing means is generally designated 10. A box 12 is provided. On the upper surface 12b of the box a switch 15 is mounted. This is normally a simple two-position toggle switch. On one side of the box 12, a rheostat 14 is provided. A variable setting knob 14a is provided on the rheostat 14 so that the resistance in the rheostat may be variably adjusted. A dial scale 14b is provided around the shaft of the rheostat knob so that the setting of the rheostat may be observed. Rheostats with control knobs and index dials are very well known and commonly obtainable items of electrical equipment.

The remainder of the essential structure of this invention is mounted on the front surface 12a of the box 12. A telescoping arm assembly generally designated 20 is mounted on this front surface 12a. The assembly 20 may also be described as a telescoping arm. It comprises a plurality of telescoping arm members so that its overall length may be adjusted. As illustrated, there are two arm members, 21 and 22 respectively. In FIGURE 2, arm member 22 is shown pulled out of arm member 21, into which it fits with a sliding fit. The external diameter of arm member 22 is the same as the internal diameter of arm member 21, with a provision for clearance so that the members may be mutually slid. There is enough friction between these parts to maintain them in the position to which they are manually moved. This portion of the structure is reminiscent of an automobile radio whip antenna.

The arm assembly 20 is mounted for pivoting around the flange 12e which is provided on front surface 12a. The pivoting means is best shown in FIGURE 1. The pivot in this embodiment is universal, that is, it permits the arm assembly to move in a vertical plane, horizontal plane, or in any intermediate plane. Pivot 21a is in this embodiment a ball and socket joint. This pivot is manually movable, but has enough internal friction to remain in the position to which it is set.

Figure 2:
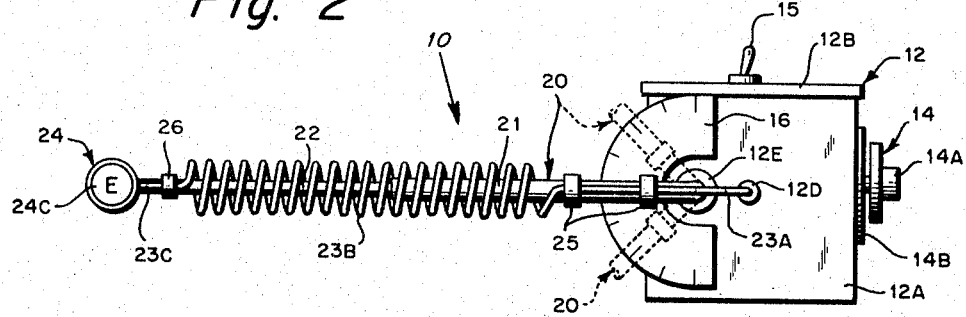
FIGURE 2 is a side view of the apparatus with the arm extended.

In FIGURE 2, the fragmented phantom line showings identified by reference numeral 2 show angular positionings of arm assembly 20 above and below the horizontal around the pivot. In FIGURE 1, the fragmented phantom line showing identified by reference numeral 20 shows an angular displacement of the arm assembly in the horizontal plane around pivot 21a.

Figure 3:
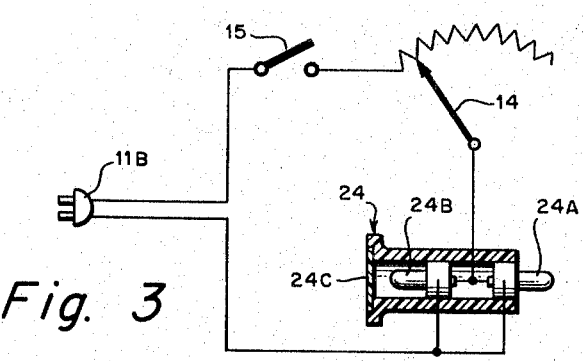
FIGURE 3 is a schematic diagram of a preferred electrical circuit of the apparatus.

Electrical conducting means are provided along assembly 20. This means comprises a coil of insulated wire 23b around the arm members 21 and 22. The coil 23b has an inner end portion 23a which runs around the pivot and into the box 12 through grommet 12d. The coil has an outer end portion 23c which runs to the fixation point assembly, generally designated 24. The fixation point includes a lamp 24a which is operatively connected to the electrical conducting means. As best shown in FIGURES 1 and 3, the fixation point assembly 24 bears the lamp 24a at one end. As best shown in FIGURE 2, the other end of the fixation point assembly 24 has a letter, in the illustrated embodiment, the letter E. This letter or other symbol or marking may be provided on a plate 24c. As best shown in FIGURE 3, a second lamp 24b is provided behind plate 24c, on which the symbol is a light conducting area. Lamp 24b is contained within the hollow body of the fixation point assembly 24.

The arm members 21 and 22 permit rotational movement as well as telescoping movement, and therefore either the letter or the lamp 24a may be directed toward the patient. The entire testing means is normally mounted on a holder, stand or other surface at approximately the eye level of the patient and in front of and slightly to one side of the patient. Thus, when the arm assembly 20 is in the extended and horizontal position shown in FIG- URE 2, the fixation point assembly 24 is approximately on a level with and in front of the eyes of the patient. The view in FIGURE 2 is as the apparatus would be seen from the ophthalmologist or other operator, therefore the patient seated on the other side would view the lamp 24a. By turning the assembly 24, the patient could view the symbol.

An electrical plug 11b of the normal household type is provided and equipped with a line cord 11a. When switch 15 is closed, the current passes through rheostat 14 and operates the lamps. Adjustment of the rheostat permits selective brightness in the lamps as desired.

While this embodiment is shown with an illuminated symbol E, it is also within the scope of this invention to provide the symbol without illumination, that is, to eliminate or douse the second lamp 24b.

The box 12 may generally be described as a support means, since its exact shape and structure are not essential to the essence of the invention. In operation, the box 12 is placed or mounted on an instrument stand as has been described. The coil 23b permits the arm assembly 20 to be extended or shortened, as shown in FIGURES 1 and 2. Wire immobilizers 25 and 26 hold the ends of the coil to their respective portions of the arm assembly. The immobilizers may normally be simple bands of elastic or non-elastic material. The line cord 11a enters box 12 through grommet 12c. The operator normally starts his examination by extending the assembly until the fixation point is directly in front of the patient and at eye level. The most important measurements to be made are the deviations from the horizontal and vertical. The operator may then make measured angular deviations of the eyes to a point in space by moving the telescoping arm assembly 20 in a vertical plane around pivot 21a and by adjusting the length of the arm. The operator measures the angular deviation on an elevation dial or scale 16. This scale 16 is mounted on the front surface 12a and is graduated with angular graduations. The numerical designations on this scale are omitted in the drawings.

The lamp or the symbol constitutes a fixation point on the fixation point assembly.

The patient's reactions or reports may be noted as the fixation point is positioned at different measured positions, or various prisms may be fitted to the patient at different positions to determine what prism is necessary to correct the image of the fixation point at various positions of the fixation point. It is apparent that this particular structure makes it possible for the operator to position the fixation point at any desired spot. For example, it is possible for him to position the point at any place in space, directly in front of the patient or to one or the other sides. The ability of the pivot and the telescoping arms to permit the fixation point to move in a horizontal plane and a vertical plane is important diagnostically.

When not in use, the arm assembly 20 may be retracted, and in addition the assembly 20 may be pivoted completely over to the other side of the box 12, that is, so that the fixation point is on the same side of the rheostat. This permits the unit to be gotten out of the way of the ophthalmologist or other operator in an expeditious manner.

It is understood that various structural changes may be made in the elements of this combination without departing from the spirit of the invention. For example, the ball and socket joint may be locked solely by friction as in the illustrated embodiment, or may be a universal joint involving meshing detents and depressions on the matching parts to give more positive positioning. It is also true that while the disclosed and illustrated wiring arrangement is preferred, it is possible to carry the wires to the lamp by different means.

One of the important advantages of this invention is that the fixation point can be moved to any particular point in space, that is, the instrument can be used for testing in any position of gaze. The art at present generally agrees that measurements in nine cardinal positions at the near range are very important. These positions are: straight ahead, up and to the right, straight to the right, down to the right, up to the left, straight to the left, down to the left, straight up, and straight down.

The scope of this invention is to be determined by the appended claims, and is not to be limited by the foregoing description and illustration which are illustrative.

I claim:

1. An extraocular muscle balance testing means to provide at least nine cardinal positions of gaze at the near range for strabismus measurements comprising:
    (a) a support means having a side,
    (b) a universal pivot on said side of said support means, an angularly graduated elevation scale positioned around said pivot,
    (c) a telescoping arm assembly with an inner end and an outer end, said inner end affixed to said universal pivot to permit said arm assembly to be selectively manually pivoted with respect to said support means to any combination of horizontal and elevational positions, comprising a plurality of arm members, each successive arm member fitting with a slidable fit into the next prior arm member,
    (d) a fixation point assembly having two alternatively selectable fixation points and mounted on said outer end of said arm assembly, said fixation point assembly having two ends, an electric lamp being fixed in one of said ends to serve as one of said fixation points and a symbol being fixed in said other end to serve as said other fixation point, said fixation point assembly being affixed to one said arm member and being rotatable around the longitudinal axis of said arm assembly by rotating said arm member within and relative to said prior arm member,
    (e) an extensible coil of insulated wire around said arm assembly, a rheostat and a switch on said support means, said coil electrically connecting said lamp to said switch and rheostat, said lamp, switch and rheostat being in series and being provided with an outside source of current.

2. An extraocular muscle balance testing means as set forth in claim 1 wherein a second lamp is provided inside said fixation point assembly, said second lamp being provided behind said symbol and illuminating said symbol from behind and within said fixation point assembly.

References Cited

UNITED STATES PATENTS

| | | | |
|---|---|---|---|
| 1,828,777 | 10/1931 | Leventhal | 351—37 |
| 2,186,408 | 1/1940 | Feldman | 351—17 |
| 2,420,012 | 5/1947 | Putnam | 351—37 |
| 3,187,170 | 6/1965 | Kille | 240—813 |

FOREIGN PATENTS 740,476  11/1932  France.

DAVID H. RUBIN, *Primary Examiner.*

R. J. STERN, *Assistant Examiner.*